Figure 1:
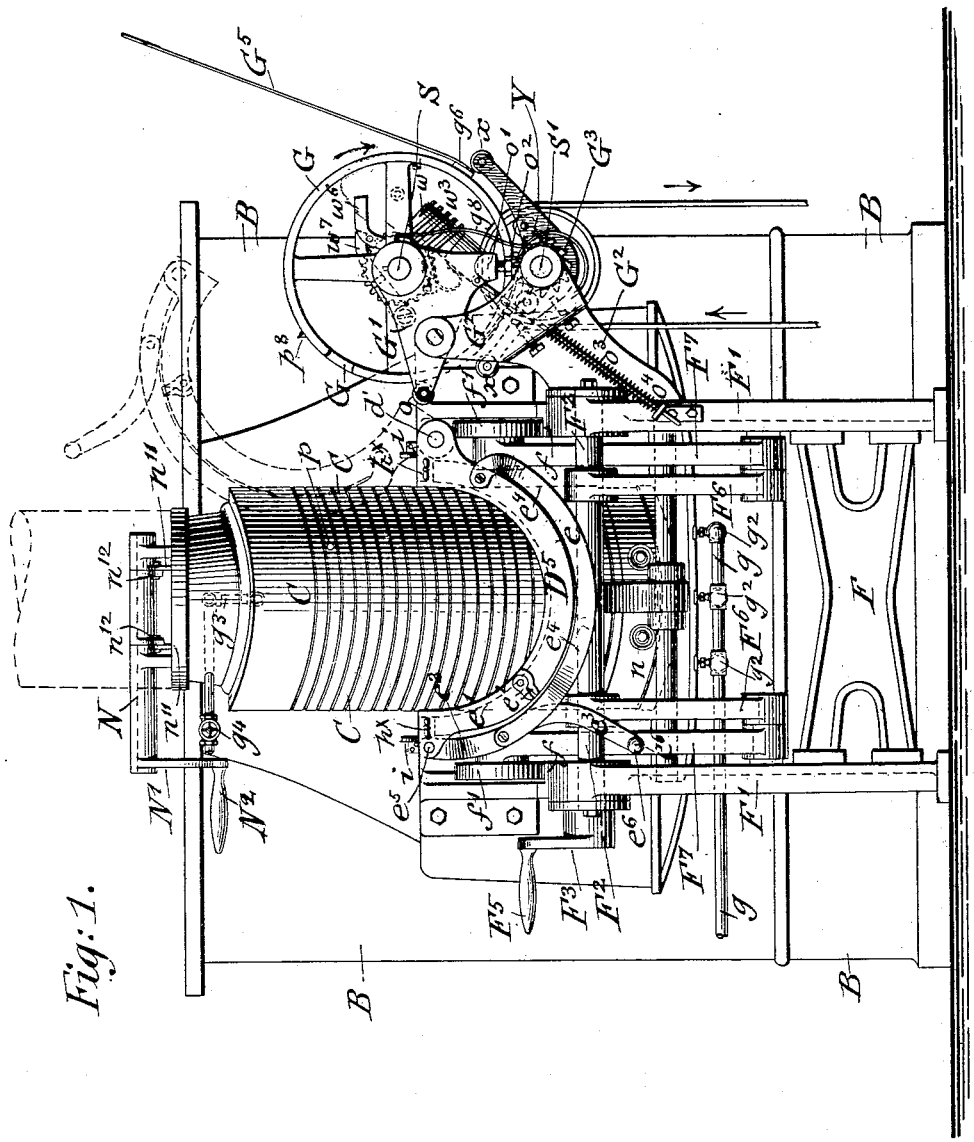

No. 733,202. PATENTED JULY 7, 1903.
C. E. HOPKINS.
MACHINE FOR CASTING AND TRIMMING STEREOTYPE PLATES.
APPLICATION FILED APR. 1, 1903.
NO MODEL. 10 SHEETS—SHEET 1.

Witnesses
Henry J. Suherbier
Frank E. Boyce

Inventor
Charles E. Hopkins
By his Attorneys

No. 733,202. PATENTED JULY 7, 1903.
C. E. HOPKINS.
MACHINE FOR CASTING AND TRIMMING STEREOTYPE PLATES.
APPLICATION FILED APR. 1, 1903.
NO MODEL. 10 SHEETS—SHEET 2.

Witnesses
Henry J. Suhrbier.
Frank E. Boyce.

Inventor
Charles E. Hopkins
by his Attorneys
Geneex Niles

No. 733,202. PATENTED JULY 7, 1903.
C. E. HOPKINS.
MACHINE FOR CASTING AND TRIMMING STEREOTYPE PLATES.
APPLICATION FILED APR. 1, 1903.
NO MODEL. 10 SHEETS—SHEET 8.
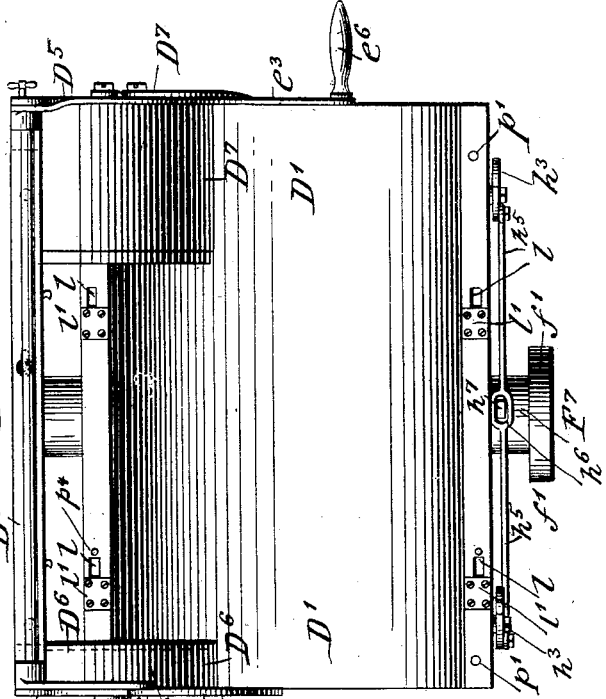
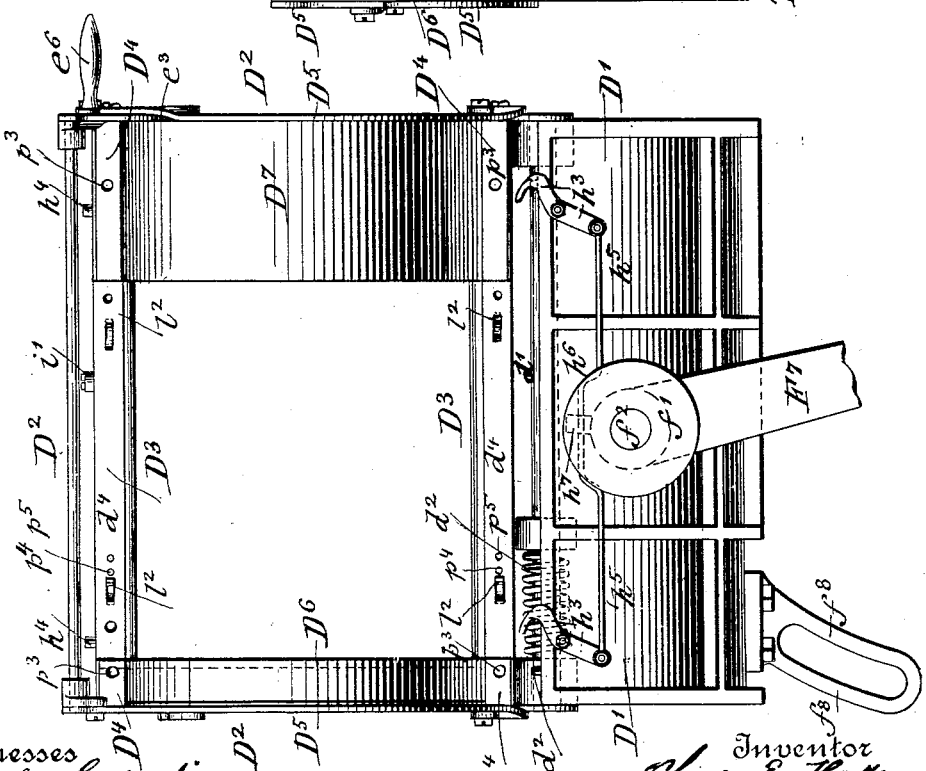

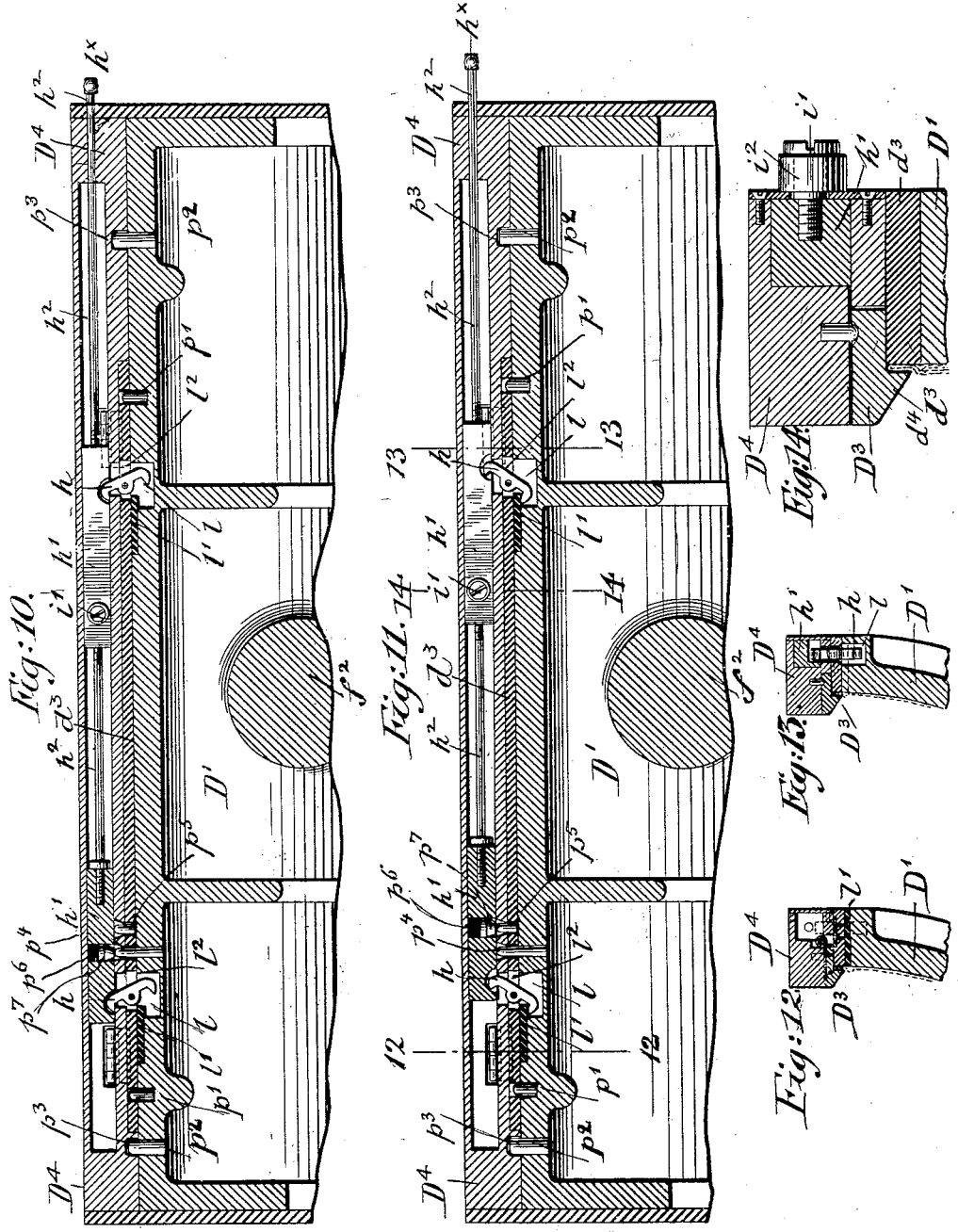

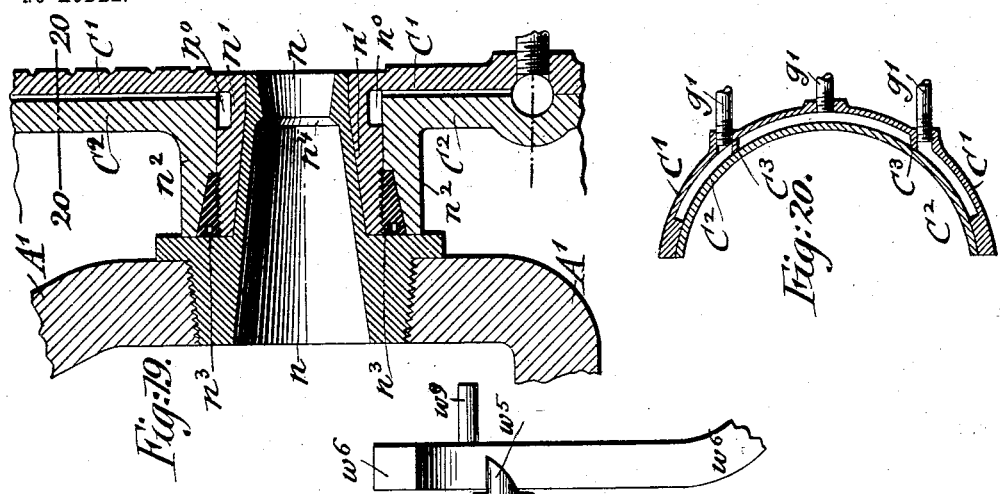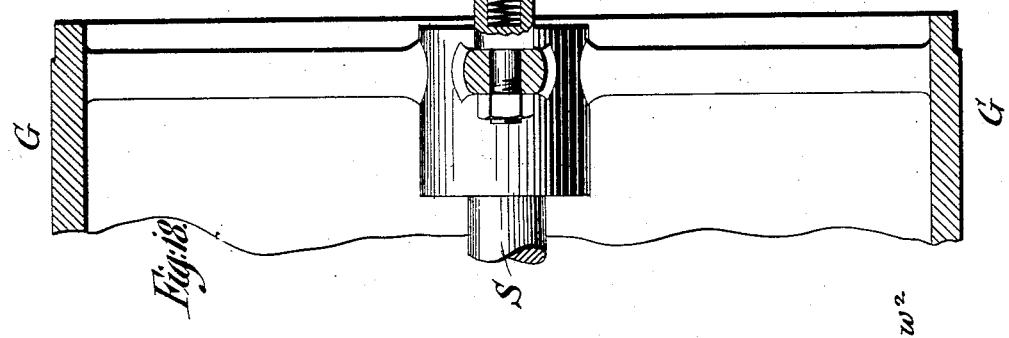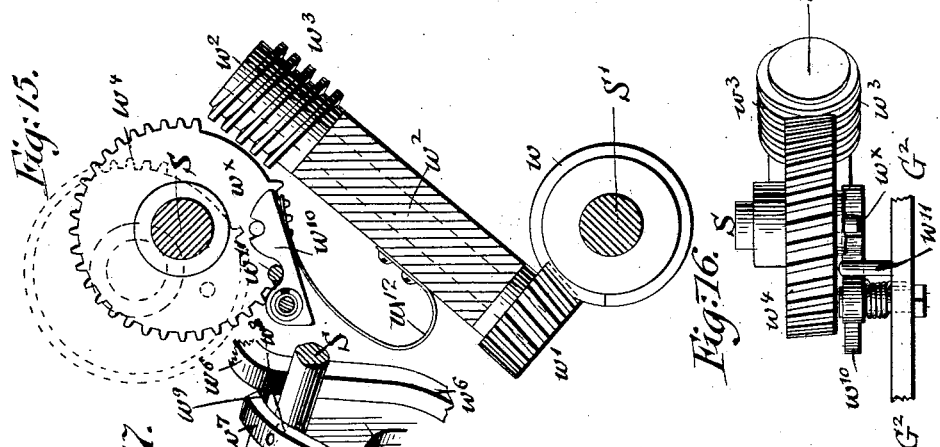

No. 733,202. Patented July 7, 1903.

UNITED STATES PATENT OFFICE.

CHARLES E. HOPKINS, OF WORCESTER, MASSACHUSETTS.

MACHINE FOR CASTING AND TRIMMING STEREOTYPE-PLATES.

SPECIFICATION forming part of Letters Patent No. 733,202, dated July 7, 1903.

Application filed April 1, 1903. Serial No. 150,610. (No model.)

*To all whom it may concern:*

Be it known that I, CHARLES E. HOPKINS, a citizen of the United States, residing in Worcester, in the county of Worcester and State of Massachusetts, have invented certain new and useful Improvements in Machines for Casting and Trimming Stereotype-Plates, of which the following is a specification.

This invention relates to improvements in the stereotyping apparatus for which an application for Letters Patent was filed by me on September 7, 1901, Serial No. 74,707, and it relates more specifically to certain improvements in casting stereotype-plates and trimming the tail ends of the same after the cast plates have been removed from the bottom of the casting-box, the casting of the plate being accomplished by manual operations, while the plate-trimming operation is accomplished by means of power in such a manner that the casting of the plate, the stripping of the matrix from the same, the return of the matrix to the bottom of the casting-box, and the trimming of the plate are performed under the full control of the operator, and thereby a machine furnished for newspaper-printing offices by which every operation is performed in an accurate and reliable manner and at a considerable saving of time as compared with the stereotype casting and trimming devices heretofore in use; and for this purpose the invention consists of a stereotype-plate-casting machine which comprises a melting-pot, one or more casting-boxes on said pot composed of two parts—an upright stationary cope and a movable drag— a toggle-lever mechanism for moving the drag from its normal horizontal position onto the cope, means for holding the matrix in the drag, means for supplying the molten metal to the interior of the casting-box for casting the plate on the matrix, and means for cooling the cope of the casting-box.

The invention consists, further, of the combination, with the bottom of the drag, of matrix-clamps with hinged casting-bars at opposite sides of the bottom, a plate-carrying frame hinged to one side of the bottom, and means for releasing or locking the matrix-clamps from or to said frame, so as to hold the matrix in the bottom of the drag or permit it to be transferred with the cast plate to the tail-trimming devices.

The invention consists, further, of means for transferring the plate-carrying frame, with the matrix and cast plate, to a plate-holding cylinder arranged alongside of the drag-supporting frame and stripping the matrix from the plate after it has been transferred to the cylinder.

The invention consists, further, of the combination, with the plate-holding cylinder and means for holding the plate on the same, of means for rotating the cylinder with the plate, rotary cutters for trimming the tail ends of the plate, and means for removing the cut-off slugs; and the invention consists, lastly, of certain details of construction and combinations of parts, which will be fully described hereinafter and finally pointed out in the claims.

Figure 2:
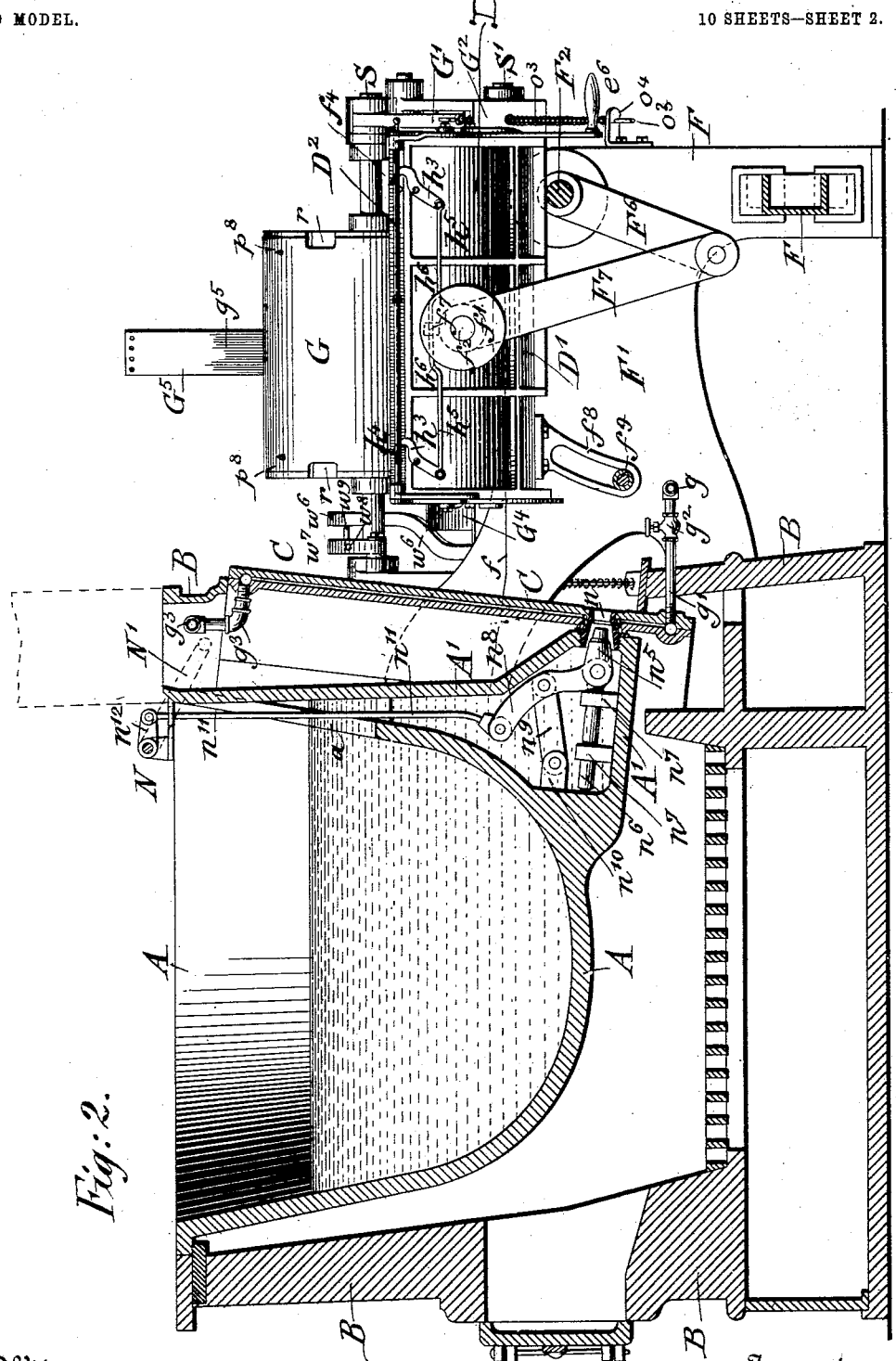
Figure 3:
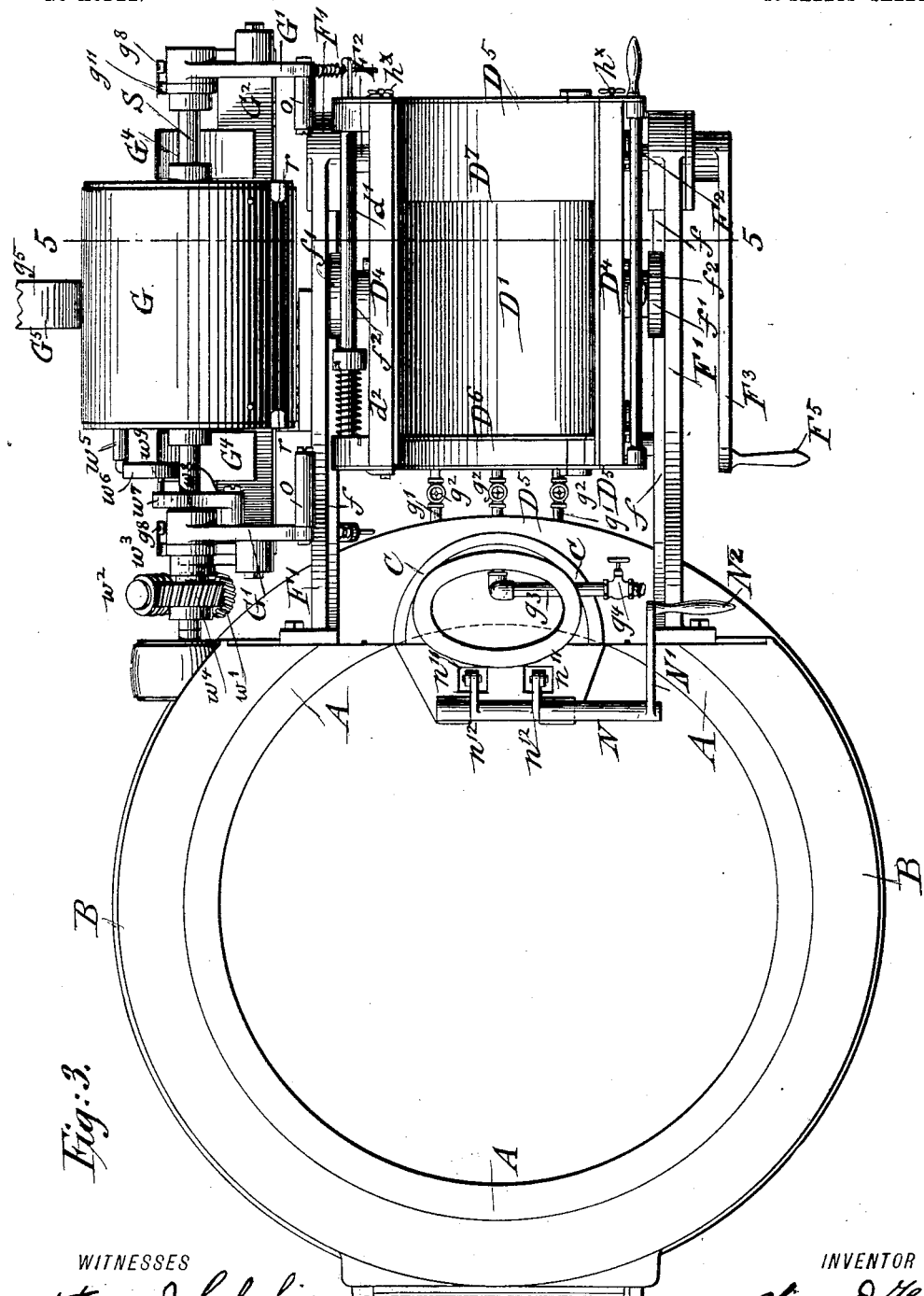
Figure 4:
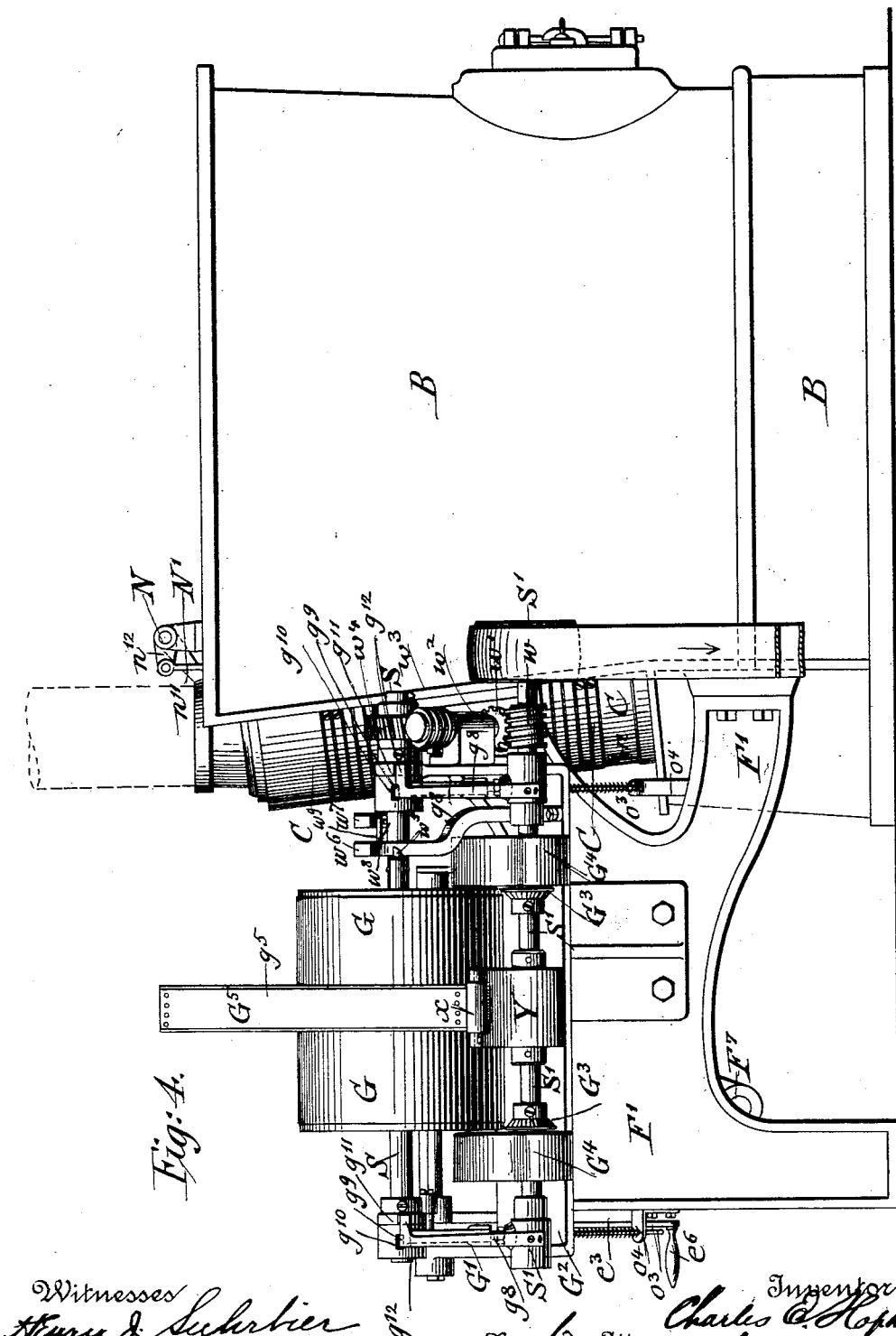
Figure 5:
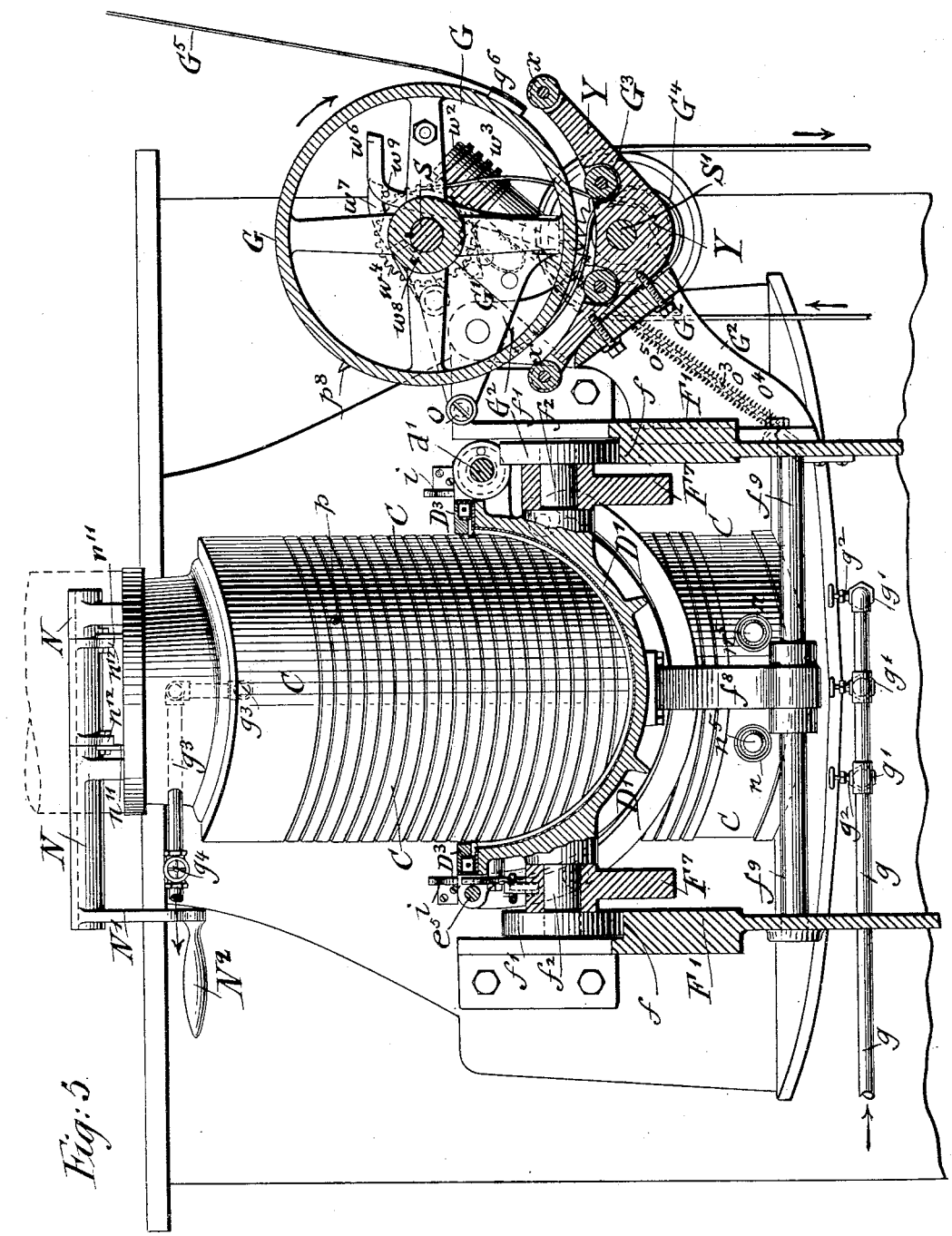
Figure 6:
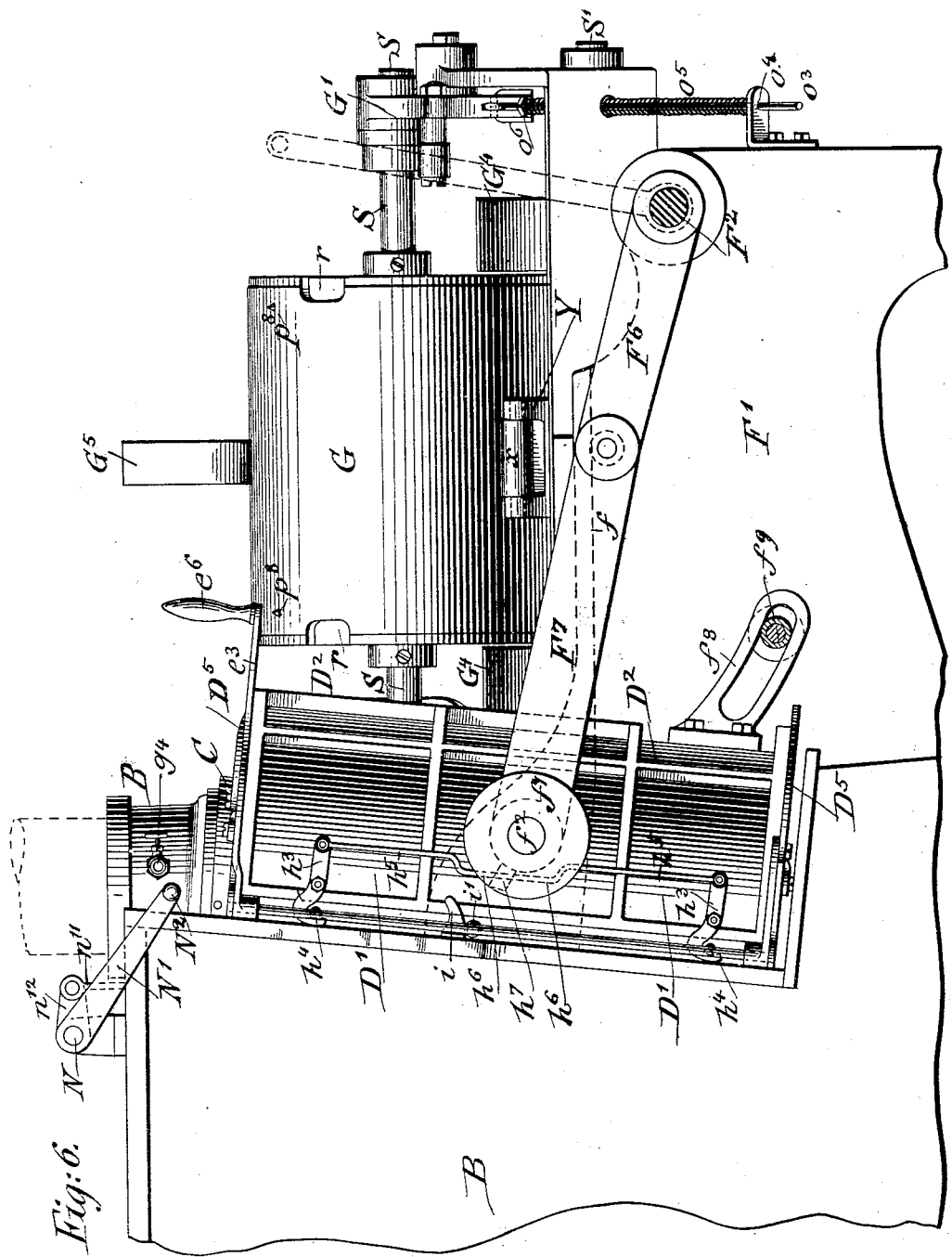
Figure 7:
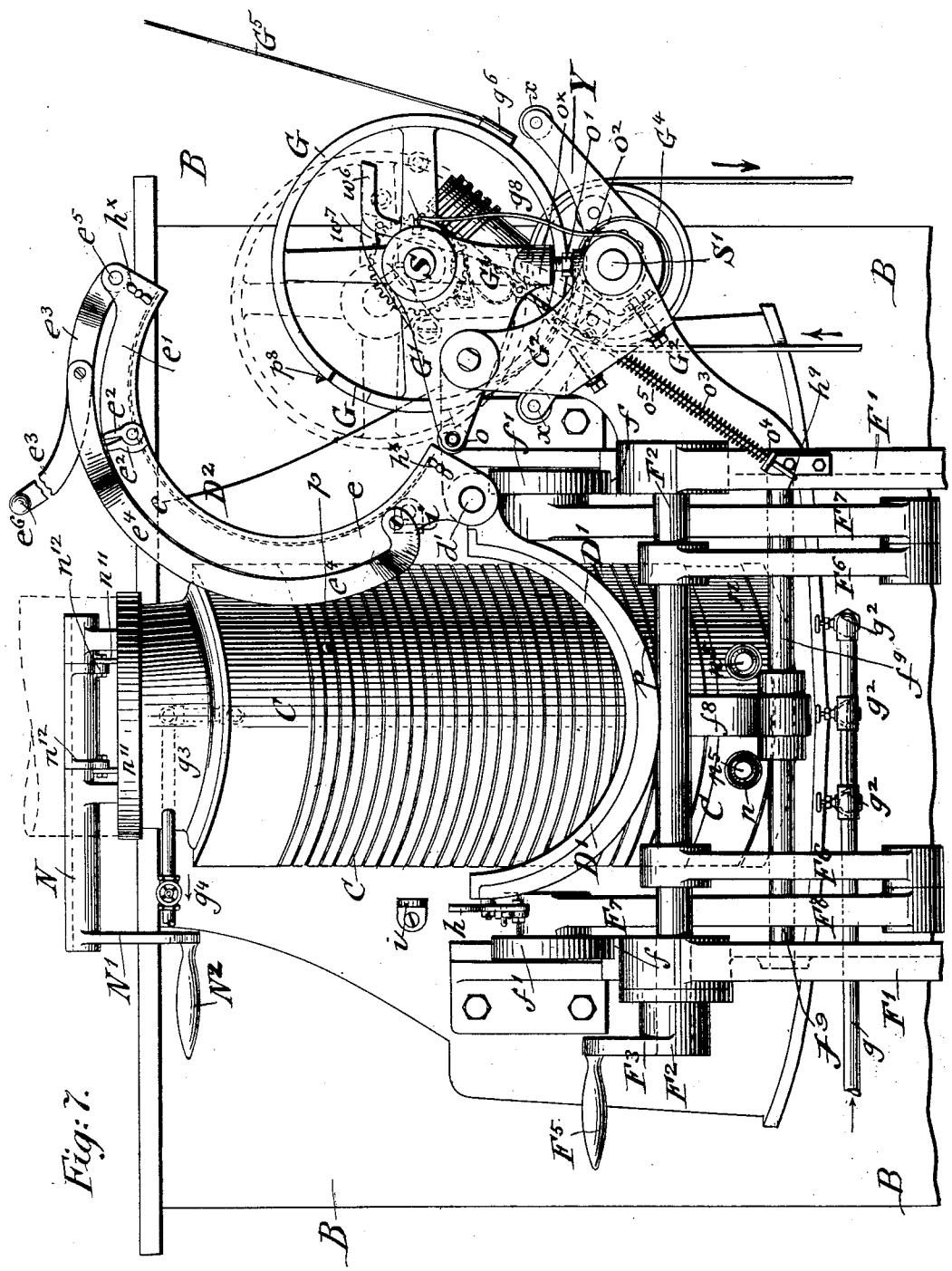

In the accompanying drawings, Figure 1 represents a front elevation of my improved machine for casting and trimming stereotype-plates, shown in normal position of rest and ready to receive a matrix. Fig. 2 is an elevation of one side of the machine, partly in vertical longitudinal section, through the melting-pot and the upright portion of the casting-box. Fig. 3 is a plan view of the machine. Fig. 4 is a side elevation of the machine, showing the opposite side of the same. Fig. 5 is a front elevation, partly in vertical transverse section, on line 5 5, Fig. 3, drawn on a larger scale. Fig. 6 is a side elevation of the machine, showing the movable section or drag of the casting-box moved up to the cope preparatory to casting the plate. Fig. 7 is a front elevation showing the plate-carrying frame with the matrix and cast plate in the act of being transferred to the plate-holding cylinder. Fig. 8 is a detail side view of the drag, showing the plate-carrying frame in raised position. Fig. 9 is a plan view of Fig. 8. Figs. 10 and 11 are detail vertical longitudinal sections showing the mechanism for locking or releasing the matrix-clamps to and from the drag or to and from the plate-carrying frame. Figs. 12, 13, and 14 are vertical transverse sections, respectively, on lines 12 12, 13 13, and 14 14 of Fig. 11. Figs. 15 and 16 are details showing the worm-gear by which motion is transmitted from the cutter-shaft to the shaft of the plate-holding cylinder. Figs. 17 and 18 are details showing the different motions imparted to the plate-holding cylinder. Fig. 19 is a detail horizontal section of one of the nozzles by which the molten metal is supplied from the melting-pot to the casting-box; and Fig. 20 is a detail horizontal section through the cope on line 20 20, Fig. 19, showing the vertical partitions in the same.

Similar letters of reference indicate corresponding parts

Referring to the drawings, A represents a melting-pot of the usual construction, which is supported on the walls of a suitable furnace B, which is heated in any suitable manner for keeping the metal supplied to the casting-mold in molten condition. The furnace B and melting-pot A may be arranged with a plurality of my improved machines for casting stereotype-plates at the front part and sides of the same, one only being shown in the drawings. Each machine for casting stereotype-plates is composed of three main portions—a casting-box, a plate-carrying frame, and a plate-holding cylinder—the casting-box being composed of a stationary section or cope C, which is arranged in upright position on the wall of the furnace, and a movable section or drag D, arranged in front of the cope and supported in a horizontal position about midway between the upper and lower ends of the cope on a frame F, that is composed of two upright parallel and transversely-braced standards F', which are attached to and extended outwardly from the wall of the furnace. The drag D is composed of two parts—a segmental bottom D', provided with exterior transverse tail-ribs and longitudinal stiffening-ribs between said tail-ribs, and a plate-carrying frame $D^2$, which is composed of side bars $D^4$, curved end bars $D^5$, and matrix-clamps $D^3$, that can be locked to or released from the side edges of the bottom D' and released from and locked to the side bars of the frame $D^2$. The lower end piece $D^5$ has an inside ring-piece $B^6$ overlapping the bottom D' and the lower edge of the matrix, and the upper end piece $D^5$ has a thin spring-steel piece $D^7$ attached thereto and overlapping the upper end of the bottom and the upper edge of the matrix. The bottom D', matrix-clamps $D^3$, and plate-carrying frame $D^2$ form in connection with the cope a casting-box in which a stereotype-plate can be cast after the matrix has been placed in position in the drag D. The side standards F' are provided with horizontal ways $f$, which are slightly inclined in upward direction at their rear ends adjacent to the cope C. On the ways $f$ are supported rollers $f'$, which are applied to trunnions $f^2$, that are cast integral with the bottom D' of the drag D, said rollers permitting the motion of the drag toward and away from the cope, while a slotted guide-segment $f^8$, that is attached centrally to the lower or rear end of the bottom D', is guided on an antifriction-sleeve of a stationary rod $f^9$, that extends transversely between the supporting-standards F'. In bearings at the front part of the standards F' is supported a transverse shaft $F^2$, to one end of which is applied a lever $F^3$, provided with a handle $F^5$. To the shaft $F^2$ are attached levers $F^6$ of a toggle-lever mechanism, the two rear levers $F^7$ of which are connected by sleeves with the trunnions $f^2$ of the bottom D' adjacent to the rollers $f'$ of the same. The adjacent ends of toggle-levers $F^6$ $F^7$ are pivotally connected with each other, as shown in Figs. 1 and 3. The toggle-lever mechanism is operated by moving the hand-lever $F^3$ from its lowermost position into raised position, as shown in dotted lines in Fig. 6, whereby the toggle-levers $F^6$ $F^7$ are nearly placed in line with each other and the drag D tilted from its horizontal position, in connection with the motion of its slotted guide-segment $f^8$, along the fixed transverse rod $f^9$ into raised position parallel with the cope and then moved in backward direction toward and onto the cope, as shown in Fig. 6. This motion of the drag D from its horizontal position into upright position on the cope and its return into horizontal position is accomplished by the operator by the coöperation of the toggle-levers $F^6$ $F^7$, trunnion-rollers $f'$, slotted guide-segment $f^8$, and stationary rod $f^9$. When the toggle-levers are placed in line with each other, the drag is firmly supported in position on the cope, ready for the casting operation, as shown in Fig. 6.

*The cope.*—The face of the cope C is made of convex shape and provided with a number of parallel transverse grooves, as shown in Figs. 1 and 4, and with registering pins $p$, projecting from its face vertically one below each other. The cope is supported on the outer wall of the furnace and separated from the melting-pot by a channel which connects the furnace with the chimney. The melting-pot A is provided with a plunger-chamber A', that is made conical at its lower end and extends toward the nozzles for the cope. The melting-pot communicates by a recess $a$ in its wall with the plunger-chamber, said recess being below the level of the molten metal, so as to keep the plunger-chamber A' filled with metal.

The cope C is formed of an interior and an exterior section, the outer section C' being provided with end shoulders and intermediate vertical partitions $C^3$, so as to form with the inner section $C^2$ narrow chambers for the cooling-water, which is supplied by a supply-pipe $g$ and branch pipes $g'$, having stop-cocks $g^2$, to the lower end of the cope, as shown in Fig. 2, while the transversely-connected upper ends of the cooling-chambers are connected with a single discharge-pipe $g^3$, having a stop-cock $g^4$ for conducting off the cooling-water.

The object of having the cope divided into longitudinal chambers is to regulate the temperature of the cope, as the center always cools slower than the sides, and to keep the face of the cope at a suitable heat, as the cast plate would otherwise show chilled spots, which is prevented by regulating the flow of water by the stop-cocks at the bottom of the cope. As the cooling-water rises simultaneously in the different cooling-chambers, a very effective cooling action is exerted on the cope. The nozzles $n$ are formed of a conical casting, which is screwed into the lower end of the plunger-chamber $A'$, as shown in Figs. 2 and 19, their front portions being snugly fitted into bushings $n'$ in the lower part of the exterior section of the cope and being surrounded by annular bushings $n^2$ on the interior section of the same. Between the bushings $n'$ $n^2$ is formed an annular cooling-chamber $n^0$ around the end of each nozzle, so that the cooling-water passes around and cools the front end of the nozzle. A tapering screw-collar $n^3$ between the inner ends of the bushings $n'$ $n^2$ forms the connection between the exterior and interior sections of the cope. Each nozzle $n$ is slightly contracted near its front end, so as to form a seat $n^4$ for the plunger $n^5$, by which the opening and closing of the nozzle is accomplished. The plunger $n^5$ is provided at its front end with a tapering portion that is somewhat smaller than the outwardly-flaring front end of the nozzle, so that when the plunger is placed in closed position in the nozzle a thin ridge of metal is formed on the cast plate in the tapering annular space between the front ends of the nozzle and plunger, which ridge on opening the casting-box breaks away at its thin inner edge and is removed with the cast plate, giving at the point where it broke away sufficient metal to seal the nozzle. This is assisted by the chilling action of the cooling-water on the metal. The plungers $n^5$ are guided in forward and backward direction by their shanks $n^6$ in keepers $n^7$, located in the bottom of the plunger-chamber $A'$ and connected by levers $n^8$, fulcrumed to links $n^9$, that are pivoted at their rear ends to stationary lugs $n^{10}$ at the lower part of the melting-pot $A$, with connecting-rods $n^{11}$ and by the latter with cranks $n^{12}$ of a crank-shaft $N$, which turns in suitable bearings on the top part of the melting-pot, as shown in Figs. 1 and 4. On the crank-shaft $N$ is mounted a lever $N'$, which is provided with a handle $N^2$, that is taken hold of by the operator when the nozzles are to be opened. The upward motion of the hand-lever $N'$ withdraws the plungers from their nozzles, so as to open them, while the downward motion of the lever closes the plungers and interrupts the flow of molten metal from the melting-pot to the casting-box. An immediate supply of metal is forced by gravity into the lower part of the casting-box as soon as the plungers are withdrawn from the nozzles when the plate is to be cast.

*The plate-carrying frame.*—The plate-carrying frame $D^2$ is composed of side bars $D^4$ and curved end bars $D^5$, the latter corresponding to the shape of the segmental bottom and being at right angles thereto, while the curved end rings $D^6$ $D^7$ overlap the bottom and are attached to the side bars, both of them having recesses at the under sides of their inner edges for the purpose of forming a space for the insertion of the edges of the matrix between the end rings and the bottom $D'$. The inner surface of the lower end ring when the drag is placed against the cope faces the nozzle-openings. The annular space between the cope and lower ring forms when the plate is cast the lower slug or tail, called the "valve-slug," while the space between the upper end ring and the cope forms the upper slug or "riser." The matrix-clamps $D^3$ are formed of bottom bars $d^3$ and casting-bars $d^4$, hinged thereto and projecting inwardly over the edges of the bottom bars.

The plate-carrying frame $D^2$ is pivoted to the bottom $D'$ at the side adjacent to the plate-holding cylinder, the side bars, the casting-bars, and the curved end bars forming the sides and ends of the casting-box when the drag is placed in position on the cope.

On the pivot-shaft $d'$ of the plate-carrying frame $D^2$ is placed a helical spring $d^2$, which is at one end attached to the bottom $D'$ and at its opposite end to a collar on the pivot-shaft of the plate-carrying frame $D^2$, said spring exerting a tension on the plate-carrying frame in the direction away from the bottom $D'$, so as to assist the lifting of the plate-carrying frame $D^2$. The end rings $D^6$ $D^7$ support the plate when it is lifted out of the bottom and until the plate-carrying frame is moved beyond the vertical plane passing through the pivot-shaft. Then the projecting side bars and casting-bars take up the weight of the plate during the downward movement to meet the rising plate-holding cylinder. The hinged casting-bars overlap the inner edges of the bottom bars of the matrix-clamps, the latter when resting on the sides of the bottom being engaged by registering pins $p'$, projecting from the sides of the bottom and locked either to the sides of the bottom $D'$ or to the side bars of the plate-carrying frame $D^2$, as required. The sides of the bottom are further provided with recesses $l$ and lips $l'$, projecting over a portion of said recesses, said lips being attached to the sides of the bottom $D'$. The bottom bars of the matrix-clamps are provided with slots $l^2$, which register with the recesses $l$ in the sides of the bottom $D'$, said bars carrying in said slots pivoted locking-hooks $h$, which project at their lower ends into the recesses and at their upper ends into recesses of slide-blocks $h'$, arranged in the side bars $D^4$ of the plate-carrying frame $D^2$, said slide-blocks being connected by longitudinal rods $h^2$, the ends of which extend through the front end bar of the frame $D^2$, as shown in Figs. 10 and 11. The casting-bars hinged to the bottom bars of the matrix-clamps project over the inner edges of said bars. The projecting portions of the casting-bars determine the thickness of the plate to be cast. Between the edge of the bottom bar of each matrix-clamp and its hinged projecting casting-bar is arranged a slight space for the inserting of the edge or "bolster" of the matrix after the same is placed in position in the bottom D', as shown in Fig. 14. The hinged casting-bars are held rigidly in position to the bottom bars by pins in the side bars $D^4$ of the frame $D^2$, which engage depressions in the upper side of the casting-bars. When the matrix-clamps $D^3$ are unlocked from the plate-carrying frame $D^2$, they are supported on the sides of the bottom and permit thereby the clamping of the matrix in position in the bottom, as the casting-bars can be raised on their hinges so as to permit the insertion of the matrix into the bottom, after which the casting-bars are lowered over the matrix. The plate-carrying frame $D^2$ is then lowered over the casting-bars, which abut against the inner edges of the upper and lower end rings and are locked to the side bars of the frame $D^2$ by the locking-hooks $h$, which are actuated by pushing the handles $h^\times$ at the ends of the longitudinal handle-rods of the slide-blocks $h'$ inwardly, as shown in Fig. 10. By the forward or backward shifting of the slide-blocks by the handle-rods the locking-hooks $h$ are operated and the locking or unlocking of the matrix-clamps to or from the plate-carrying frame and to or from the bottom is accomplished.

To the left-hand side of the bottom D' is applied a locking device composed of curved hooks $h^3$, which are pivoted near each end of the bottom, and above the hooks are arranged on the plate-carrying frame suitable studs $h^4$, which are engaged by the curved hooks $h^3$. A pivot-rod $h^5$ connects the lower ends of the hooks, said rod passing over the end of the lever $F^7$ and having a slotted opening $h^6$ for the passage of a lug $h^7$, attached to the lever $F^7$, so that when the bottom, with the matrix, matrix-clamps, and plate-carrrying frame on the same, is moved up toward the cope the lug $h^7$, attached to the lever $F^7$, forces the connecting-rod $h^5$ in the opposite direction to the motion of the drag, which causes the curved hooks to engage the studs and lock thereby the plate-carrying frame firmly to the bottom, as shown in Fig. 6. When the drag arrives on the cope, curved stationary lugs $i$ at both sides of the cope-supporting frame engage rollers $i'$, that are carried on pins $i^2$ (shown in Fig. 14) of the slide-blocks $h'$ and move thereby the slide-blocks, so that the matrix-clamps are automatically unlocked from the sides of the bottom and locked to the plate-carrying frame if the operator did not do it by hand, as shown in Fig. 11. As the drag is withdrawn from the cope after the plate has been cast, the lugs $i$ are released from the rollers $i'$ without changing the position of the slide-blocks and handle-rods, so that when the drag is returned into horizontal position the plate-carrying frame, matrix, and matrix-clamps are united and can be swung on the pivot-shaft of the plate-carrying frame by the operator into raised position for transferring the plate to the plate-holding cylinder. The bottom D' is provided near its ends with registering pins $p^2$, which engage corresponding sockets or tenons $p^3$ in the side bars of the plate-carrying frame. In addition to the registering pins the bottom is provided in each side with a pin $p^4$, projecting through the matrix-clamp into the side bar of the plate-carrying frame $D^2$, while an additional pin $p^5$, attached to each matrix-clamp adjacent to and longitudinally in line with the one attached to the bottom, also extends into the side bar of the plate-carrying frame, as shown clearly in Figs. 10 and 11. In the slide-block $h'$, adjacent to the pins $p^4$ $p^5$, is arranged a socket $p^6$, in which is located a tapered and spring-actuated stud $p^7$, that forms contact with either one of the pins $p^4$ $p^5$, according as the slide-block is in the position shown in Fig. 10 or Fig. 11. The spring-cushioned stud $p^7$ fits into tapering recesses in the side bars adjacent to the slide-block, so that when the plate-carrying frame is separated from the matrix-clamps the studs are moved into the tapering holes and prevent thereby any shifting motion of the slide-blocks. This function is accomplished whether the side bars are in position on the matrix-clamps or not, so that in either position of the slide-blocks they are locked against shifting motion, the pins and studs forming thereby a safety device for the correct positioning of the slide-blocks.

The curved end bars $D^4 D^5$ of the plate-carrying frame $D^2$ are made of two sections—a longer section $e$, adjacent to the pivot connection with the bottom D', and a shorter end section $e'$. Adjacent to the pivot connection between the sections $e e'$ are arranged on the sections shoulders $e^2$, between which an oblique space is formed, said shoulders abutting against each other when the shorter end section $e'$ is moved outwardly on its pivot connection with the longer section.

To the curved end bars of the plate-carrying frame $D^2$ are pivoted curved straps $e^3$ $e^4$, which conform for the greater part of their length to the shape of the curved end bars and which are also made each of a longer and a shorter strap-section, the shorter strap-sections $e^3$ being pivoted to the ends of the longer strap-sections $e^4$ and attached solidly by their other ends to a shaft $e^5$, extending along the free end of the plate-carrying frame $D^2$. The shorter strap $e^3$ at the front end bar $D^5$ is extended beyond its pivot connection with the longer strap and provided with a handle $e^6$ at the end of its extended portion, as shown in Fig. 7, a separating-space being provided between the inner edges of the handle-strap $e^3$ and longer strap $e^4$, and of the curved end bars $D^4$ $D^5$, so as to provide a certain play for the downward motion of the handle-strap. The handle-straps $e^3$ and the longer straps $e^4$ form a kind of toggle-lever by which when the handle is taken hold of and pressed in downward direction toward the curved end bars the handle-strap is placed in contact with the shorter section of the curved end bar $D^5$, so as to move the curved longer strap likewise toward the same and remove the shorter section of the curved end bar and the casting-bar into an obtuse angle to the longer section for the purpose of releasing first the casting-bar from the edge of the cast plate and stripping then the adjacent end of the matrix from the plate. This stripping or peeling off of the matrix takes place approximately for the length of the shorter sections of the curved end bars. As the backward motion of the handle is continued after the sections of the curved end bars are thus set at an obtuse angle to each other at their pivoted ends, the motion imparted by the handle-strap to the longer section of the curved end bars, and thereby to the plate-carrying frame, is slowly continued, so that the matrix is gradually stripped off from the plate resting on the plate-holding cylinder and the plate-carrying frame, with the matrix, moved away from the plate-holding cylinder and returned to the bottom $D'$ ready for casting the next plate. As the plate-holding cylinder has been raised for meeting the plate-carrying frame while the cast plate is being transferred to the surface of the cylinder, the cylinder simultaneously with the withdrawal of the plate-carrying frame is gradually lowered into its former position, so that as the plate recedes from the matrix the latter is peeled off from the plate in a very reliable and effective manner by the motion imparted to the plate-carrying frame and the receding motion of the cylinder without injuring the matrix during this peeling off or stripping operation.

*The plate-holding cylinder.*—When the plate-carrying frame, with the matrix and plate in position thereon, is moved from the bottom by the operator and placed into raised position, as shown in Fig. 7, the side bar adjacent to its pivot connection with the bottom engages antifriction-rollers $o$ at the ends of triangular brackets $G'$, which are fulcrumed to stationary side brackets $G^2$, that extend at right angles from the right-hand side standard $F'$, said movable brackets having at their lower ends sockets $o^x$, carrying set-screws $o'$, which rest on seats $o^2$ on the stationary side brackets $G^2$ and which screws serve for accurately adjusting the fulcrumed triangular brackets $G'$ into proper position on the stationary side brackets. The fulcrumed triangular brackets $G'$ support in bearings at their upper corners the shaft $S$ of the plate-holding cylinder $G$, while their lower corners are connected by guide-rods $o^3$ with lugs $o^4$ on the side standard $F'$ and cushioned by helical springs $o^5$, interposed between said lugs and collars $o^6$ on the guide-rods $o^3$. On returning the plate-carrying frame and matrix into the bottom $D'$ the plate-holding cylinder $G$ and triangular brackets $G'$ are simultaneously returned to their normal position, as shown in full lines in Fig. 7. Vertically below the cylinder-shaft $S$ is supported in bearings at the outer ends of the stationary side brackets $G^2$ a cutter-shaft $S'$, on which are mounted two beveled cutters $G^3$ for cutting off the tail ends of the cast plate. The cutter-shaft $S'$ receives continuous rotary motion by a belt and pulley transmission from a suitable power-shaft, which motion is transmitted by a worm $w$ at its rear end to a worm-gear $w'$ at the lower end of an inclined worm-shaft $w^2$, which is supported in a bearing on the stationary rear bracket $G^2$. The upper end of the worm-shaft $w^2$ carries a worm $w^3$, which meshes with a worm-gear $w^4$ on the rear end of the cylinder-shaft $S$ when the cylinder $G$ is returned with the cast plate into its lower or normal position. A spring-actuated catch $w^5$ on one of the arms of the supporting spider-frames of the cylinder $G$ (shown in Figs. 4 and 18) engages during the upward movement of the cylinder a stationary curved arm $w^6$ on the side bracket of the supporting-frame and imparts to the cylinder a slight rotary motion on its axis. Simultaneously with this rotary motion imparted to the cylinder a locking-pawl $w^7$, provided with a socket and pivoted to the fulcrumed rear bracket $G'$, is lifted with the fulcrumed bracket and cylinder and drops as the cylinder ceases its upward movement and is turned on its axis onto a radial pin $w^8$ on the shaft $S$ of the cylinder, so as to interlock therewith. The locking-pawl $w^7$ and pin $w^8$ hold thereby the cylinder stationary on its axis while in raised position, as shown in dotted lines in Fig. 7, so that the cylinder is in position to receive the plate delivered by the plate-carrying frame. Registering pins $p^8$ on the circumference of the cylinder $G$ enter into the depressions that are formed in the plate by the projecting pins $p$ on the cope and hold thereby the plate in proper register on the cylinder. As the cylinder is locked by the pawl in raised position, it is prevented from tilting forward by the weight of the plate. The plate is then lowered with the plate-holding cylinder for the reason that the fulcrumed and oscillating brackets are permitted to return into their former position on the stationary side brackets $G^2$ by the return of the plate-carrying frame onto the bottom $D'$. During the downward motion of the cylinder the outer end of the locking-pawl $w^7$ engages a laterally-projecting pin $w^9$ on the stationary arm $w^6$, as shown clearly in Figs. 4 and 7, and is thereby lifted off the pin $w^8$ on the shaft of the cylinder, so as to release the latter as the worm-gear $w^4$ on the cylinder-shaft comes into mesh with the worm $w^3$ on the worm-shaft $w^2$, imparting thereby rotary motion to the shaft of the plate-holding cylinder. During the upward motion of the plate-holding cylinder a pin $w^\times$ on the worm-gear $w^4$ on the cylinder-shaft is released from a recessed catch-piece $w^{10}$, which is pivoted to the rear bracket $G^2$ and acted upon by a flat spring $w^{12}$, that is attached to the bracket-bearing of the worm-shaft $w^2$ and to the under side of the catch-piece $w^{10}$, as shown in Fig. 15, for the reason that the pivoted and spring-actuated catch-piece is prevented from following the pin $w^\times$ by a stop-pin $w^{11}$ on the stationary rear bracket $G^2$, as shown in Figs. 15, 16, and 17. The worm-gear $w^4$ on the cylinder-shaft S is made without teeth for a portion of its circumference corresponding to the length of the motion-transmitting worm $w^3$ on the inclined worm-shaft $w^2$, so that when the shaft of the plate-holding cylinder is in normal position no rotary motion is transmitted from the worm-shaft $w^2$ to the mutilated worm-gear $w^4$, as shown in Fig. 15. During the raising of the plate-holding cylinder G and shaft S and the slight turning motion imparted to the shaft by the action of the stationary arm $w^6$ on the catch $w^5$, before described, the worm-gear $w^4$ is turned on its axis with the shaft S to such an extent that when the cylinder is lowered with the plate on the same by the returning of the plate-carrying frame to the bottom of the drag the worm-gear $w^4$ is placed instantly in mesh with the worm $w^2$ on the shaft $S^2$, so that rotary motion is immediately transmitted to the shaft of the plate-holding cylinder and the tail ends of the plate subjected to the action of the cutters on the cutter-shaft. The cutters are clearly shown in Fig. 4. The slugs after being cut off slide down over spring-guards $G^4$ adjacent to the cutters, so as not to drop on the parts in motion, being then collected and returned to the melting-pot. The lower ends of the spring-guards $G^4$ are attached to the under side of the stationary side brackets $G^2$ and bent over the cutter-shaft, their upper ends conforming to and bearing on the tail ends of the cast plate during the rotary motion of the plate-holding cylinder and holding up the slugs while being cut off by the cutters. The plate itself is held on the circumference of the cylinder and "hugged" to the same by the action of a flexible steel band $G^5$, provided at its face side with a cushioning felt or leather band $g^5$, said band being attached at its lower end to a keeper $g^6$ on the surface of the plate-holding cylinder, as shown clearly in Fig. 6, and bent around the plate during the rotating motion imparted to the cylinder by forming contact with a number of antifriction-rollers X, which are supported in a stationary yoke Y, that is attached to the stationary bracket-frame about midway below the cylinder G, as shown clearly in Figs. 4 and 7. The yoke Y is provided with an opening for the passage of the cutter-shaft. Two connecting spring-arms $g^8$, which are attached at their lower ends to the bearings of the cutter-shaft S', engage by their bent-over upper ends $g^9$ recesses $g^{10}$ in the bearings of the fulcrumed brackets, so as to lock the bearings of the cutter-shaft and the bearings of the cylinder-shaft together until nearly one complete rotation of the plate-holding cylinder has been made, when cams $g^{11}$ on the cylinder-shaft engage laterally-projecting portions $g^{12}$ of the spring-arms $g^8$ and move them away, so as to clear the recesses in the bearings of the cylinder and permit the raising of the cylinder under the influence of the plate-holding frame for the next transfer of a plate to the same. When the rotation of the shaft of the plate-holding cylinder is completed, the worm-gear on the cylinder-shaft assumes its normal position, (shown in Fig. 15,) while the worm on the worm-shaft continues to rotate adjacent to the untoothed portion of the worm-gear, but without transmitting motion to the cylinder-shaft. Simultaneously a V-shaped recess in the outer end of the spring-actuated catch-piece $w^{10}$ reëngages the pin $w^\times$ on the worm-gear $w^4$ and holds it in this position until its pin is released again from the catch-piece by the next lifting and axially-turning motion of the cylinder.

The cutters $G^3$ on the cutter-shaft S' are made beveled, so as to produce simultaneously with the cutting off of the slugs the beveling of the edges of the plate. They are rotated continuously under the influence of the motion-transmitting mechanism, together with the inclined worm-shaft $w^2$, while the plate-holding cylinder is only rotated when it is returned with the cast plate from its raised position into its lower position, in which the cutters cut off the tail ends of the plate. As the cylinder with the plate on the same makes one complete rotation the flexible steel band $G^5$ is carried along with the cylinder over the antifriction-rollers X of the yoke Y, so as to hug the plate onto the cylinder until its rotation is nearly completed, when the steel band $G^5$ straightens again up into its former upright position, as shown in the different figures of the drawings. The trimmed plate is then removed from the cylinder by placing the hands into the recesses $r$ at opposite sides of the cylinder, as shown in Fig. 6, and removed for being finished. The plate-holding cylinder is now in position to receive the next plate, which has been cast in the meantime in the casting-box from the plate-carrying frame, and present it to the cutters for cutting off the tail ends in the manner described.

*Operation.*—The operation of my improved machine for casting stereotype-plates may be divided into two separate parts: first, the operation of the casting devices, which is performed by manual labor, and the operation of the plate-holding cylinder and cutters by which the tail ends of the cast plate are cut off and which is accomplished by power.

The operation of the casting devices is performed as follows: The drag is placed in horizontal position. The handle-rods of the slide-blocks of the plate-carrying frame are then pulled in outward direction by the operator, so as to release the matrix-clamps, with their hinged casting-bars, from the plate-carrying frame and attach them to the segmental bottom of the drag. The plate-carrying frame is then lifted on its pivot-shaft, so that its side bar adjacent to the pivot-shaft rests against the antifriction-rollers of the fulcrumed cylinder-supporting brackets, as shown in dotted lines in Fig. 1 and full lines in Fig. 7. The hinged casting-bars of the matrix-clamps are then turned up. The flexible matrix is grasped at its edges by the hands of the operator and transferred into the bottom of the drag, so that its bolsters are alongside of the matrix-clamps. The casting-bars are then turned down over the side bolsters of the matrix. The plate-carrying frame is then lowered down over the sides and ends of the bottom, and the lower and upper tail-rings of the plate-carrying frame overlap the curved end bolsters of the matrix and hold it snugly in the bottom. The lever which actuates the toggle-joint mechanism is then taken hold of by the operator and moved in forward and upward direction, so that the drag is moved backward toward the cope. The slotted guide-bracket attached to the lower end of the bottom turning around the stationary transverse rod of the supporting-frame causes the drag to turn from its horizontal position in a position parallel with the cope, after which it is moved in forward direction until the parts forming the drag unite with the cope and produce a closed casting-box. During the turning movement of the drag the locking-hooks attached to the side of the bottom are operated by the lug on one of the toggle-levers, so as to lock the bottom and plate-carrying frame firmly together, while the forward movement of the drag toward the cope causes the antifriction-rollers on the pins of the slide-blocks of the plate-carrying frame to come in contact with the curved stationary lugs on the cope-supporting wall of the furnace, said friction-rollers moving along the curved lugs and pushing the slide-blocks downward, so as to unlock thereby the matrix-clamps from the bottom and relock them automatically to the plate-carrying frame. As the toggle-levers are placed in line with each other, they hold the drag rigidly in position on the cope, so as to form a closed casting-box with the same. The operator then lifts the lever-handle which actuates the plungers of the nozzles at the lower end of the cope, so that the metal is allowed to flow by gravity into the lower end of the casting-box until it fills the casting-chamber of the same. When the casting-box is filled with molten metal, the operator lowers the lever that actuates the plungers, so as to close the nozzles and interrupt the flow of metal. The operator then waits for a short time for permitting the metal in the casting-box to cool by the action of the cooling-water passing through the hollow cope. The casting-box is then opened by moving the lever which actuates the toggle-levers in backward and downward direction, so as to return the drag into its former horizontal position. During the return motion of the drag the plate-carrying frame is unlocked from the bottom by the releasing of the locking-hooks. The operator then grasps the handle of the plate-carrying frame with his disengaged hand and lifts the plate-carrying frame, with the cast plate, flexible matrix, and matrix-clamps, in a direction at right angles to the direction of motion of the drag out of the bottom onto the plate-holding cylinder without requiring any intervening manipulation. The tapering pins located on the cope form recesses at the inner side of the cast plate, which recesses meet during the transfer of the cast plate to the plate-holding cylinder corresponding pins on the plate-holding cylinder and serve as registering devices for positioning the cast plate on the same and for preventing it from slipping around the cylinder after the cast plate has been released from the plate-carrying frame. As the plate-carrying frame is raised beyond the vertical plane passing through its pivot-shaft the weight of the plate is transferred from the lower and upper tail-rings, which support the same, onto the casting-bars, which prevent the plate from dropping out of the plate-carrying frame during its downward motion toward the plate-holding cylinder, which is raised by the pressure of the side bar of the plate-carrying frame on the antifriction-rollers of the fulcrumed brackets of the cylinder. As the cast plate moves into position on the plate-holding cylinder the weight of the plate is released from the plate-carrying frame and transferred entirely upon the cylinder. The operator then pulls the handle of the plate-carrying frame slowly in downward direction toward the end bars, so that the shorter pivoted sections of the plate-carrying frame, to which the handle-strap is connected, are moved away from the plate, withdrawing thereby the casting-bar from under the edge of the plate and at the same time releasing or peeling off that part of the matrix from the casting-bar toward the pivot connection of the sectional end bars of the plate-carrying frame. The operator continues the downward motion upon the handle of the plate carrying frame, so that the latter is turned on its pivot-shaft away from the cast plate, while it frees at the same time the matrix from the face of the plate and at the same time withdraws the casting-bar on the pivoted side of the frame from under the adjacent edge of the plate. Simultaneously the plate-holding cylinder is returned to its lower normal position. The operator continues the turning motion of the plate-carrying frame on its pivot-shaft until the frame and matrix are returned in position on the bottom ready for the next casting operation. The plate-carrying frame being thus returned to the bottom and the cast plate transferred onto the plate-holding cylinder, the second operation—namely, the cutting off of the curved tail ends from the cast plate—is performed. For this purpose the continuously-rotating cutter-shaft and worm-shaft operated by the same are placed by the lowering of the plate-holding cylinder automatically into gear with the worm-gear on the cylinder-shaft. The worm-gear transmission then transmits rotary motion from the cutter-shaft to the shaft of the plate-holding cylinder. The worm-gear on the cylinder-shaft has several teeth removed for the purpose of disengaging the worm on the intermediate worm-shaft when the cylinder has completed its rotation and is in its normal position of rest. The mutilated worm-gear is provided with a laterally-projecting pin that engages a spring-actuated catch-piece on the stationary bracket supporting the worm-shaft. This pin is lifted out of engagement with the catch-piece, and as the cylinder is raised by the weight of the plate-carrying frame bearing on the fulcrumed brackets of the cylinder a spring-actuated stop attached to one of the spokes of the cylinder comes into contact with the upper horizontal part of a stationary arm on the stationary bracket-frame, so that the cylinder is turned somewhat on its axis during the remainder of its rising operation. The object of thus causing the cylinder to turn on its axis is to properly position the worm-gear attached to the cylinder-shaft so that on the return movement of the cylinder the untoothed portion of said worm-gear is in such a position that the adjacent teeth of the worm-gear come in mesh with the worm on the upper end of the worm-shaft when the cylinder has reached its lowermost position. When the cylinder is at its extreme point of elevation, a curved pawl that is pivoted to the fulcrumed cylinder-supporting rear bracket engages a pin on the cylinder-shaft and locks the cylinder in position, so as to prevent it from turning on its axis. As the cast plate meets the cylinder the tapering pins upon the surface of the plate-holding cylinder enter the recesses cast in the plate and hold the plate on the cylinder. As soon as the operator has released the plate-carrying frame from the plate and begins to return the frame to the bottom the cylinder with the plate is moved in downward direction. As the plate now rests entirely on the cylinder and in a position at one side of the vertical center plane of the same, the cylinder would be liable to turn toward the plate-carrying frame but for the interlocking of the curved pawl with the pin on its shaft. In case the matrix should stick to the cast plate the operator can immediately discontinue the stripping movement of the matrix from the plate and gradually work the defective part loose in the same manner as the matrix is stripped or peeled off gradually by hand from a plate. When the cylinder arrives in its lowermost position, the worm-gear on the cylinder-shaft having been turned on its axis is placed into mesh with the worm on the rotating worm-shaft, while the swinging end of the curved pawl is arrested by a pin on the stationary arm, so as to be disconnected from the pin on the cylinder-shaft, whereby the cylinder is permitted to be rotated by the worm-gear mechanism. The movement that brings the worm-gear on the cylinder-shaft and the worm on the worm-shaft into mesh also moves two eccentric cams and permits two locking spring-arms to enter into the recesses in the fulcrumed cylinder-supporting brackets, so that the brackets and the bearings of the cutter-shaft are locked firmly together during the rotation of the cylinder. During the rotation of the cylinder with the plate on the same a flexible steel band with a cushioning-piece of felt on its face side, which steel band is attached to the cylinder at a point in advance of the cast plate on the same, is placed in contact with the antifriction-rollers on the face of the concave yoke below the plate-holding cylinder, so that the steel band is pressed tightly against the cast plate and holds it in position on the cylinder. As the cylinder continues its rotation the tail ends of the cast plate are attacked by the rotary cutters, so that both tail ends are cut off at one operation during the rotation of the cylinder. The tail ends or slugs cut off from the plate by the action of the rotary cutters are taken up by the inclined guard-springs and conducted over the same, being then returned to the melting-pot. As the cylinder approaches the end of its rotation the eccentric cams on the cylinder-shaft force the ends of the connecting spring-arms that unite the fulcrumed brackets and the stationary side brackets out of the recesses in the fulcrumed brackets, so that the cylinder is liberated and ready to be again elevated for receiving the next plate that is transferred thereto by the plate-carrying frame. The flexible steel band attached to the cylinder, by which the plate is held fast on the same, is returned at the end of the rotation of the cylinder into its normal raised position. Immediately before the cylinder reaches the end of its rotation the pin attached to the side of the worm-gear on the cylinder-shaft presses down the spring-actuated catch-piece pivoted to the stationary rear bracket by passing over the beveled end into the V-shaped recess of the catch-piece, the curved spring of the catch-piece forcing it up and holding thereby the worm-gear on the cylinder-shaft in position out of mesh with the rotating worm on the worm-shaft. During the cutting off of the tail ends of the cast plate by the cutters the operator has moved up the drag with the matrix onto the cope and has made another cast in the casting-box. While the cast plate is cooling, he reaches over to the plate-holding cylinder, takes hold of the plate that has just been trimmed by the cutters by placing his hands into the hand-recesses at the opposite sides of the cylinder, and removes it for the finishing operation. The casting of the plate and the cutting off of the tail ends of the same on the plate-holding cylinder are thus performed by the combination of the two operations described—namely, the manual casting operation and the automatic cutting off of the tail ends from the plate.

Having thus described my invention, I claim as new and desire to secure by Letters Patent—

1. In a machine for casting and trimming stereotype-plates, the combination, with a furnace, of a melting-pot supported in the same, a casting-box comprising a stationary upright cope attached to the side of the furnace, and a movable drag, means for supplying molten metal to the lower end of said casting-box, a cooling-chamber in said cope, means for supplying water to the lower end of the cooling-chamber in the same direction as the supply of molten metal to the casting-box, and means for discharging the cooling-water from the upper end from said cooling-chamber, substantially as set forth.

2. In a machine for casting and trimming stereotype-plates, the combination, with a furnace, of a melting-pot supported in the same, a casting-box consisting of a stationary upright cope and a movable drag, a cooling-chamber in said cope, nozzles at the lower part of the cope, annular cooling-chambers extending around said nozzles and connected with the cooling-chamber of the cope, valved pipes for supplying water to the lower end of the cooling-chamber, and a valved discharge-pipe connected with the upper end of the same, substantially as set forth.

3. In a machine for casting and trimming stereotype-plates, the combination, with a furnace, of a melting-pot supported in the same, a casting-box formed of a stationary upright cope and a movable drag, nozzles extending through said cope, a valve-chamber connecting said nozzles with the melting-pot, valve-plugs for opening and closing said nozzles, said nozzles and valve-plugs being provided with seats, said nozzles being provided with outwardly-flaring and the plugs with tapering ends for providing an annular space in the outer end of the nozzles for forming an annular ridge on the valve-plug, substantially as set forth.

4. In a machine for casting and trimming stereotype-plates, the combination, with a furnace, of a melting-pot supported in the same, a casting-box formed of a stationary upright cope and a movable drag, nozzles in the lower end of said cope, said nozzles being provided with an inner conical portion, a contracted seat and an outwardly-flaring end, a valve-chamber connecting the nozzles with the melting-pot, valve-plugs for opening and closing said nozzles, said plugs being provided with a seat portion and a tapering end, and means for operating said valve-plugs for opening and closing the nozzles, substantially as set forth.

5. In a machine for casting and trimming stereotype-plates, the combination, with a melting-pot, of a casting-box comprising a stationary upright cope and a movable drag, a cooling-chamber in said cope, longitudinal partitions extending throughout said cooling-chamber, means for supplying molten metal to the lower end of the casting-box, and means for supplying water to the lower end of each individual compartment of the cooling-chamber and discharging it from the upper ends of the same, substantially as set forth.

6. In a machine for casting and trimming stereotype-plates, the combination of a stationary upright cope, a drag supported normally in horizontal position intermediately between the upper and lower ends of the cope, trunnion-rollers at opposite sides of the drag, a guide-bracket at the lower end of the drag, a stationary guide-rod for the same, a shaft below the upper end of the drag, and a toggle-lever mechanism between the trunnions and said actuating-shaft for permitting the raising of the drag against the cope or the return of the same into horizontal position, substantially as set forth.

7. In a machine for casting and trimming stereotype-plates, the combination, with a stationary upright cope, of a movable drag located in front of the cope intermediately between the upper and lower ends of the same, upright standards provided with guideways, trunnion-rollers on the drag guided in said ways, a transverse shaft supported on said standards, a toggle-lever frame between said shaft and the trunnions of the drag, a segmental bracket at the lower end of the drag, and a stationary transverse rod passing through said segment, said toggle-lever mechanism and segment imparting motion to the drag for moving the same up to the cope, substantially as set forth.

8. In a machine for casting and trimming stereotype-plates, the combination of a casting-box consisting of an upright stationary cope and a movable drag, said drag being composed of a curved bottom, a plate-carrying frame corresponding in shape to the bottom, and matrix-clamps at opposite sides of said frame, said matrix-clamps being composed of bottom bars and casting-bars hinged thereto, and means for transferring said matrix-clamps from the side bars of the plate-carrying frame to the sides of the bottom and back to the side bars of the frame, substantially as set forth.

9. In a machine for casting and trimming stereotype-plates, the combination of a casting-box consisting of an upright stationary cope and a movable drag, said drag being formed of a curved bottom and a plate-carrying frame hinged to one side of said bottom, said plate-carrying frame being composed of straight side bars and curved end bars, a narrow tail-ring adjacent to the lower end bar, a wider sheet-metal tail-ring adjacent to the upper end bar, both tail-rings being provided with recesses at their under sides, substantially as set forth.

10. In a machine for casting and trimming stereotype-plates, the combination, with a stationary upright cope, of a movable drag located in front of the same, said drag consisting of a curved bottom, a plate-carrying frame hinged to one side of the same, mechanism for lifting or lowering the drag to and from the cope, and means for locking the plate-carrying frame to the opposite side of the bottom, in connection with said drag-operating mechanism, substantially as set forth.

11. In a machine for casting and trimming stereotype-plates, the combination, with a stationary upright cope, of a movable drag in front of the cope, said drag being composed of a curved bottom and a plate-carrying frame hinged at one side of the same, and means for automatically locking or releasing said plate-carrying frame to and from the bottom during the raising or lowering motion imparted to the same, substantially as set forth.

12. In a machine for casting and trimming stereotype-plates, the combination, with an upright cope, of a movable drag in front of the same, said drag being composed of a curved bottom and a plate-carrying frame hinged at one side to the bottom, locking-hooks pivoted at the opposite side of the bottom and adapted to engage pins on the adjacent side of the plate-carrying frame, a pivot-rod connecting the lower ends of said hooks, said connecting-rod being provided with a slotted portion, a toggle-lever mechanism for moving the drag up to the cope or returning the same in normal position, one of said toggle-levers being provided with a lug for engaging the slotted portion of the connecting-rod for automatically locking or withdrawing the hooks from the pins on the plate-carrying frame, substantially as set forth.

13. In a machine for casting and trimming stereotype-plates, a casting-box, consisting of a cope, a movable drag in front of the cope, said drag consisting of a curved bottom, a plate-carrying frame hinged to the same, and matrix-clamps adapted to be locked to or released from the plate-carrying frame, or released from or locked to the bottom, substantially as set forth.

14. In a machine for casting and trimming stereotype-plates, a drag, consisting of a curved bottom, a plate-carrying frame hinged to one side of the same, said plate-carrying frame being composed of straight side bars, curved end bars and curved tail-rings adjacent to said end bars, slide-blocks guided in the side bars of the frame, said slide-blocks being provided with handle-rods, and locking-hooks operated by said slide-blocks for locking the matrix-clamps to the plate-carrying frame, substantially as set forth.

15. In a machine for casting and trimming stereotype-plates, the combination, with an upright cope, of a movable drag consisting of a curved bottom, a plate-carrying frame hinged to one side of the same, matrix-clamps supported on the sides of the bottom and the side of the plate-carrying frame, means for transferring said matrix-clamps automatically from the bottom to the plate-carrying frame when moving the drag onto the cope, substantially as set forth.

16. In a machine for casting and trimming stereotype-plates, the combination, with an upright cope, of a drag composed of a curved bottom, a plate-carrying frame hinged to one side of the same, matrix-clamps locked to the side bars of the plate-carrying frame, slide-blocks in the side bars of said frame, handle-rods for operating the same, projecting pins on said slide-blocks, and stationary lugs sidewise of the cope on the supporting-frame of the same for automatically transferring the matrix-clamps from the bottom to the plate-carrying frame during the movement of the drag onto the cope, substantially as set forth.

17. In a machine for casting and trimming stereotype-plates, the combination, with a drag, composed of a curved bottom, a hinged plate-carrying frame, matrix-clamps, and means for locking the matrix-clamps to the side bars of the frame, of a plate-holding cylinder arranged alongside of the drag, and means for moving the plate-carrying frame with the matrix-clamps, matrix and cast plate onto the plate-holding cylinder, substantially as set forth.

18. In a machine for casting and trimming stereotype-plates, the combination, with a drag composed of a curved bottom and a plate-carrying frame hinged to one side of the same, of a plate-holding cylinder arranged alongside of said drag, means for raising the plate-carrying frame and swinging it on its hinge connection over on the plate-holding cylinder, and means for simultaneously raising the plate-holding cylinder for bringing it in contact with the plate-carrying frame, substantially as set forth.

19. In a machine for casting and trimming stereotype-plates, the combination, with a drag composed of a curved bottom, a plate-carrying frame hinged to one side of the same, and matrix-clamps attached to the side bars of said frame, of a plate-holding cylinder arranged alongside of the drag, and means for swinging the plate-carrying frame and matrix-clamps on its hinge connection with the bottom over on the cylinder and simultaneously raising the latter, substantially as set forth.

20. In a machine for casting and trimming stereotype-plates, the combination, with a drag composed of a curved bottom, a plate-carrying frame hinged to one side of the same, and matrix-clamps locked to the side bars of said frame, of a plate-holding cylinder arranged alongside of the drag, a handle for moving the plate-carrying frame on its hinge connection with the bottom over onto the plate-holding cylinder, means for simultaneously raising the plate-holding cylinder so as to receive the plate-carrying frame and the plate in the same, and means for locking the cylinder in raised position, substantially as set forth.

21. In a machine for casting and trimming stereotype-plates, the combination, with a drag composed of a curved bottom, a plate-carrying frame hinged to one side of the same, and matrix-clamps on the side bars of the frame, of a plate-holding cylinder, a handle-frame for moving the plate-holding frame over onto said cylinder, means for simultaneously raising said cylinder so as to meet the plate-carrying frame, means for locking said cylinder in raised position, and means for withdrawing a portion of the plate-carrying frame from the plate, substantially as set forth.

22. In a machine for casting and trimming stereotype-plates, the combination, with a drag composed of a curved bottom and a plate-carrying frame hinged to one side of said bottom, of a counterbalancing-spring placed on the pivot-shaft of the plate-carrying frame and connected with the bottom and frame respectively, a plate-holding cylinder arranged alongside of the drag, and means for moving the plate-carrying frame with the plate onto said cylinder, substantially as set forth.

23. In a machine for casting and trimming stereotype-plates, the combination, with a drag composed of a curved bottom and a plate-carrying frame hinged to the same, of a plate-holding cylinder arranged alongside of the drag, and fulcrumed brackets supporting the shaft of said cylinder, said plate-carrying frame being adapted to raise the movable brackets and cylinder when being moved from the bottom onto the cylinder, substantially as set forth.

24. In a machine for casting and trimming stereotype-plates, the combination, with a drag composed of a curved bottom, a plate-carrying frame hinged to the same, matrix-clamps supported on the side bars of said plate-carrying frame, of a plate-holding cylinder arranged alongside of the drag, fulcrumed brackets provided with bearings for the shaft of said cylinder, and antifriction-rollers on the ends of the brackets adjacent the drag, said plate-carrying frame engaging said rollers and causing the cylinder to rise and meet the plate-carrying frame as it is moved from the bottom onto the cylinder, substantially as set forth.

25. In a machine for casting and trimming stereotype-plates, the combination, with a drag composed of a curved bottom and a plate-carrying frame hinged to one side of the same, of a plate-holding cylinder arranged adjacent to said drag, a hinge connection between the bottom and plate-carrying frame, stationary side brackets, and movable brackets fulcrumed to said side brackets and provided with bearings for the cylinder-shaft, said plate-carrying frame being adapted to raise the movable brackets and cylinder, substantially as set forth.

26. In a machine for casting and trimming stereotype-plates, the combination, with a drag formed of a curved bottom and a plate-carrying frame hinged to one side of the same, of a plate-holding cylinder arranged alongside of the drag, means for raising said cylinder into contact with the plate-carrying frame, and means connected with the plate-carrying frame for stripping off a portion of the matrix from the plate, substantially as set forth.

27. In a machine for casting and trimming stereotype-plates, the combination, with a drag composed of a curved bottom, and a plate-carrying frame hinged to one side of the same, said plate-carrying frame consisting of straight side bars and curved end bars, each end bar being formed of a longer and a shorter section, and means connected with the outer ends of said shorter sections of the end bars for oscillating the shorter end sections on the longer end sections, substantially as set forth.

28. In a machine for casting and trimming stereotype-plates, the combination, with a bottom, of a plate-carrying frame hinged to one side of the same, said plate-carrying frame being composed of straight side bars and curved end bars, each end bar being formed of a shorter and a longer section pivoted at their adjacent ends, and a handle-frame attached to the ends of the shorter sections of the curved end bars and adapted to move the shorter end sections on the longer sections for stripping the matrix from the adjacent end of the plate, substantially as set forth.

29. In a machine for casting and trimming stereotype-plates, the combination, with a drag composed of a curved bottom and a plate-carrying frame hinged to one side of the same, said plate-carrying frame being composed of straight side bars and curved end bars, each of said end bars being formed of a longer and a shorter section pivoted at their adjacent ends, handle-straps pivoted to the outer ends of the shorter sections of the end bars, and additional straps connecting said handle-straps with the opposite ends of the longer sections of the end bars for permitting the withdrawal of the shorter sections of the end bars by the lever connection of the handle-straps from under the edge of the plate, substantially as set forth.

30. In a machine for casting and trimming stereotype-plates, the combination, with a drag composed of a curved bottom and a plate-carrying frame hinged to one side of the same, of a plate-holding cylinder, means for bringing the plate-carrying frame over on said cylinder and simultaneously raising the same to meet the frame, matrix-clamps locked to the side bars of said frame and composed of bottom bars and hinged casting-bars, and means for releasing said casting-bars of the matrix-clamps from the plate and stripping the matrix from the end portion of the plate, substantially as set forth.

31. In a machine for casting and trimming stereotype-plates, the combination, with a drag composed of a curved bottom and a plate-carrying frame hinged to one side of the same, of a plate-holding cylinder located sidewise of said drag, fulcrumed brackets supporting said cylinder, means for raising the brackets and cylinder, means for simultaneously turning the cylinder on its axis, and means for locking the cylinder against axial motion when in raised position, substantially as set forth.

32. In a machine for casting and trimming stereotype-plates, the combination, with a drag composed of a curved bottom and a plate-carrying frame hinged to one side of the same, of a plate-holding cylinder arranged alongside of the drag, means for raising the cylinder when transferring the plate from the bottom to the plate-holding cylinder, means for positioning the cylinder for receiving the plate, means for locking the cylinder against axial motion when receiving the plate, and means for releasing the cylinder-shaft on the return of the plate-carrying frame to the bottom, substantially as set forth.

33. In a machine for casting and trimming stereotype-plates, the combination, with a drag formed of a curved bottom and a plate-carrying frame hinged to one side of the bottom, of a plate-holding cylinder arranged sidewise of said drag and provided on its circumference with pins registering with depressions in the plate for positioning the plate on the cylinder, substantially as set forth.

34. In a machine for casting and trimming stereotype-plates, the combination, with a drag composed of a curved bottom, a plate-carrying frame hinged to one side of the same, and matrix-clamps composed of bottom bars and casting-bars hinged thereto, said plate-carrying frame consisting of straight side bars and curved end bars, of slide-blocks in said side bars, handle-rods connected with said slide-blocks, locking-hooks fulcrumed in recesses of said bottom bars and operated by said slide-blocks for locking the matrix-clamps to the sides of the curved bottom or to the side bars of the frame, and means for locking the slide-blocks against shifting after the matrix-clamps have been locked to the sides of the bottom or the side bars of the frame, substantially as set forth.

35. In a machine for casting and trimming stereotype-plates, the combination, with a drag having a curved bottom, of matrix-clamps resting on the sides of said curved bottom and composed of bottom bars and casting-bars hinged to the bottom bars, and means for locking the bottom bars to the sides of the curved bottom, substantially as set forth.

36. In a machine for casting and trimming stereotype-plates, the combination, with a drag having a curved bottom, of positioning-pins in the sides of the bottom, and matrix-clamps composed of bottom bars having openings registering with said positioning-pins and casting-bars hinged to said bottom bars, and means for locking the matrix-clamps in position on the sides of the bottom for inserting the matrix, substantially as set forth.

37. In a machine for casting and trimming stereotype-plates, the combination, with a drag having a curved bottom provided in its sides with recesses and lips projecting over said recesses, of matrix-clamps resting on the sides of the bottom, said matrix-clamps being composed of bottom bars having slots adjacent to the recesses in the sides of the curved bottom and casting-bars hinged to the bottom bars, and hooks fulcrumed in the slots of said bottom bars and adapted to lock the matrix-clamps to the sides of the curved bottom, substantially as set forth.

38. In a machine for casting and trimming stereotype-plates, the combination, with a drag composed of a curved bottom and a plate-carrying frame hinged to one side of the same, of a plate-holding cylinder, a cutter-shaft supported adjacent thereto, cutters on said shaft, and motion-transmitting mechanism between the rotary cutter-shaft and the cylinder-shaft for imparting rotary motion to the cylinder, substantially as set forth.

39. In a machine for casting and trimming stereotype-plates, the combination, with a drag composed of a curved bottom and a plate-carrying frame hinged thereto, of a plate-holding cylinder, a cutter-shaft adjacent to said cylinder, cutters on said shaft, means for locking the cylinder-shaft and cutter-shaft in fixed position relatively to each other, and means for imparting rotary motion from the cutter-shaft to the cylinder for cutting off the tail ends of the plate, substantially as set forth.

40. In a machine for casting and trimming stereotype-plates, the combination, with a drag composed of a curved bottom and a plate-carrying frame hinged to one side of said bottom, of a plate-holding cylinder provided with a flexible plate-retaining band attached to the face of the cylinder, a cutter-shaft adjacent to the cylinder, and a stationary yoke below the plate-holding cylinder for hugging the band around the plate on the cylinder while cutting off the tail ends, substantially as set forth.

41. In a machine for casting and trimming stereotype-plates, the combination, with a drag composed of a curved bottom and a plate-carrying frame hinged at one side of the same, of a plate-holding cylinder, fulcrumed brackets for supporting the shaft of the same, stationary side brackets for supporting said fulcrumed brackets, a cutter-shaft supported in bearings of said stationary brackets, means for locking the bearings of the cutter-shaft and cylinder-shaft together, tail-cutters on the cutter-shaft, and means for transmitting rotary motion from the cutter-shaft to the cylinder-shaft for rotating said cylinder and plate for cutting off the tail ends of the same, substantially as set forth.

42. In a machine for casting and trimming stereotype-plates, the combination, with a drag composed of a curved bottom and a plate-carrying frame hinged to one side of the same, of a plate-holding cylinder arranged alongside of the drag, means for raising the cylinder when transferring the plate from the bottom to the plate-holding cylinder, means for positioning the cylinder for receiving the plate, means for locking the cylinder against axial motion while receiving the plate, means for releasing the cylinder-shaft on the return of the plate-carrying frame to the bottom of the drag, means for lowering the cylinder into its former position, a cutter-shaft adjacent to the cylinder, tail-cutters on said shaft, and means for transmitting rotary motion from the cutter-shaft to the cylinder when the same arrives in its normal position, substantially as set forth.

43. In a machine for casting and trimming stereotype-plates, the combination, with a drag composed of a curved bottom and a plate-carrying frame hinged to one side of said bottom, of a plate-holding cylinder, stationary side brackets, movable brackets fulcrumed to the stationary brackets and provided with bearings for the cylinder-shaft, a cutter-shaft supported in bearings of the stationary brackets, means for locking the bearings of the cylinder-shaft and cutter-shaft together, tail-cutters on the cutter-shaft, means for transmitting rotary motion from the cutter-shaft to the cylinder-shaft, means for releasing the locking mechanism from the bearings of the cylinder-shaft when the tail-cutting operation is completed, substantially as set forth.

44. In a machine for casting and trimming stereotype-plates, the combination, with a drag composed of a curved bottom and a plate-carrying frame hinged to one side of the bottom, of a plate-holding cylinder, a rotary cutter-shaft adjacent to said cylinder, tail-cutters on said shaft, means for transmitting rotary motion from the cutter-shaft to the cylinder-shaft for cutting off the tail ends of the plate, and stationary spring-guards adjacent to the ends of the cylinder, substantially as set forth.

In testimony that I claim the foregoing as my invention I have signed my name in presence of two subscribing witnesses.

CHARLES E. HOPKINS.

Witnesses:
PAUL GOEPEL,
HENRY J. SUHRBIER.